Aug. 3, 1926.

T. C. LEAKE 1,594,887

SUPPORT FOR TRACTION ELEMENT OF TRACTORS

Filed May 26, 1922      2 Sheets-Sheet 1

INVENTOR
Thomas C. Leake
BY
Duell, Warfield & Duell
ATTORNEY

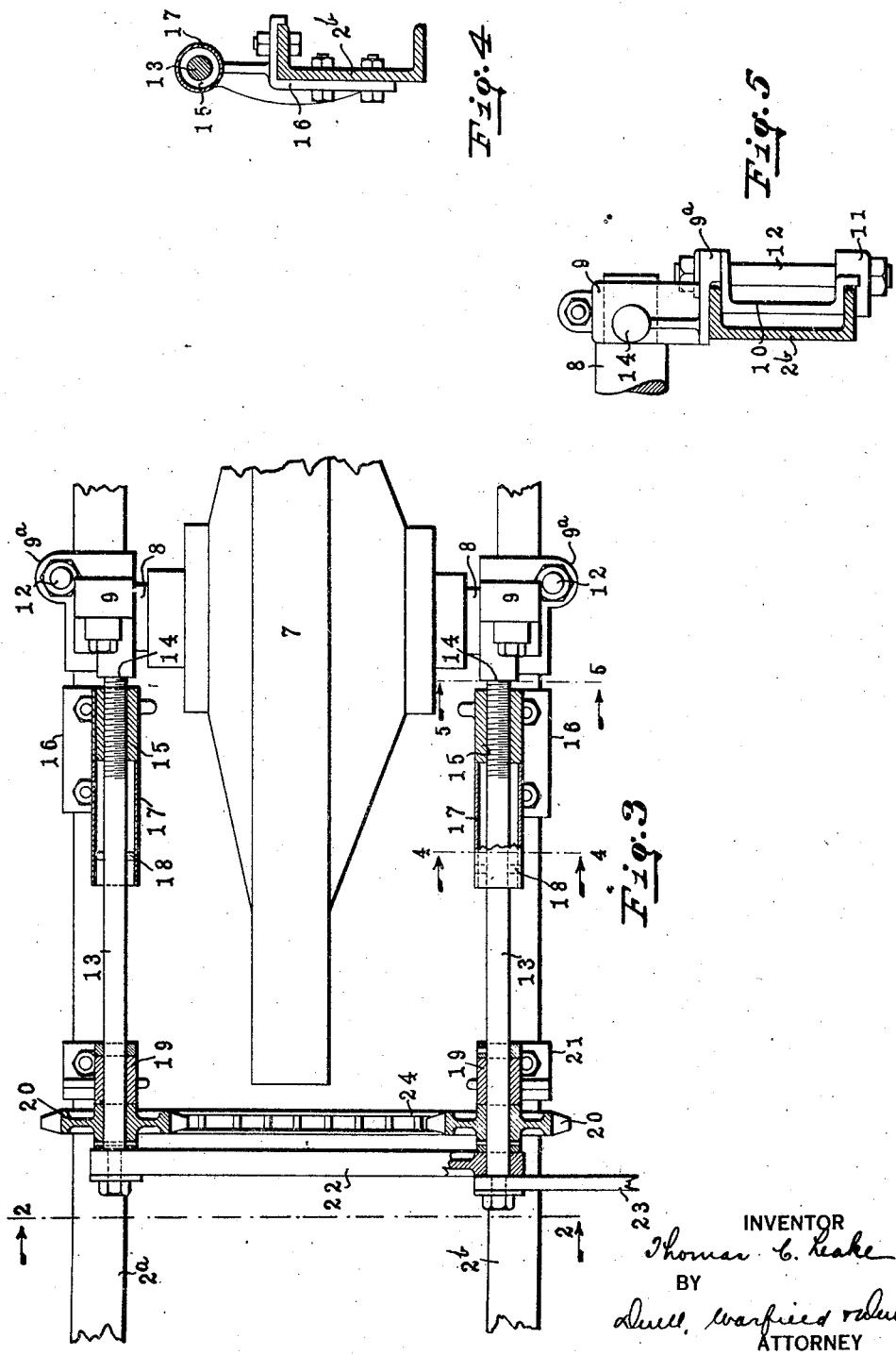

Patented Aug. 3, 1926.

1,594,887

UNITED STATES PATENT OFFICE.

THOMAS C. LEAKE, OF NEW YORK, N. Y., ASSIGNOR, BY MESNE ASSIGNMENTS, TO BEAR TRACTOR CORPORATION OF AMERICA, OF NEW YORK, N. Y., A CORPORATION OF DELAWARE.

SUPPORT FOR TRACTION ELEMENT OF TRACTORS.

Application filed May 26, 1922. Serial No. 563,978.

This invention relates to tractors, and more particularly in some of its details to tractors of the endless-chain track-laying type and to the tractor frames thereof for supporting the chain track.

The invention has for its general object an improved construction and arrangement of parts which is strong, reliable under various operative conditions, and economical from a manufacturing standpoint.

A more specific object of the invention is to improve the tractor frames and the disposition of the chain track and track-supporting idler or sprocket thereon.

Still another object is to improve the means for securing and adjusting the front idlers or sprockets on the tractor frames.

The invention accordingly consists in the features of construction, combinations of elements and arrangement of parts which will be exemplified in the construction hereinafter set forth, and the scope of the application of which will be indicated in the following claims.

For a more complete understanding of the nature and advantages of the invention reference should be had to the following description, setting forth the best illustrative embodiments at present known, taken in connection with the accompanying drawings showing an illustrative embodiment, and in which—

Fig. 3 is a top plan view of Fig. 2, certain parts being shown in section, and

Figs. 4 and 5 are detailed sectional views taken respectively on the line 4—4 and 5—5 of Fig. 3.

Figure 1:
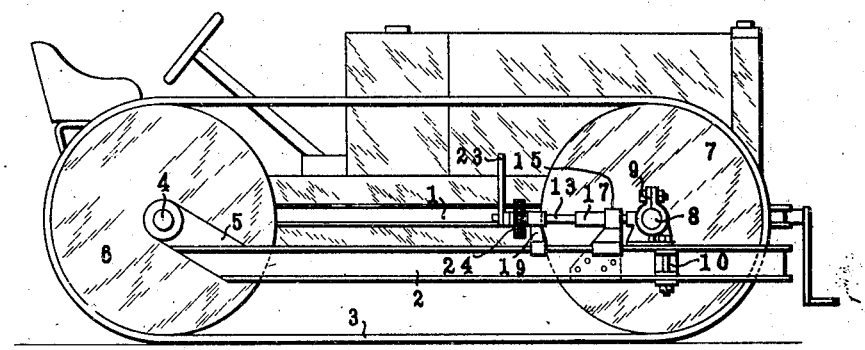
Figure 1 is a side elevation of a tractor of the type mentioned, constructed in accordance with the invention, certain parts being diagrammatically shown for simplicity of illustration.
Figure 2:
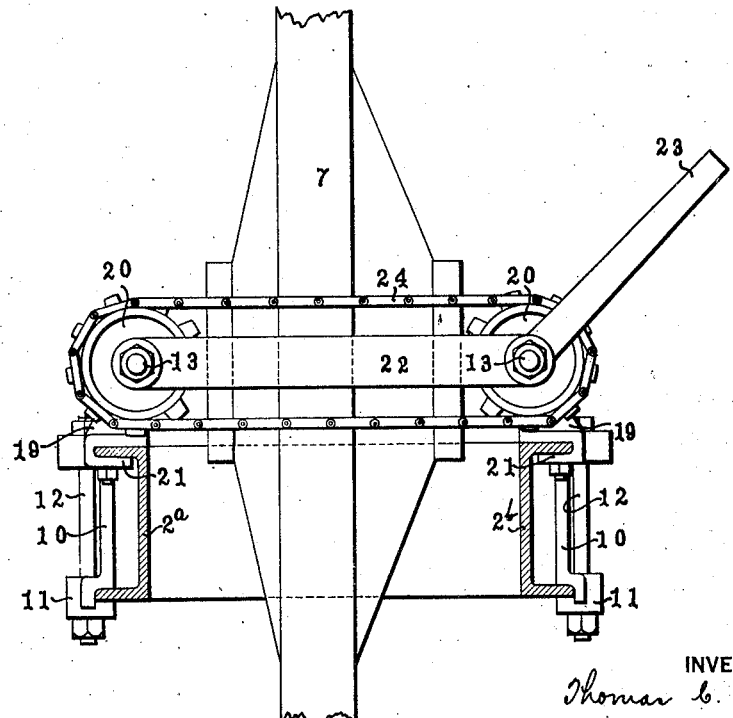
Fig. 2 is an enlarged fragmentary sectional elevation taken approximately on the line 2—2 of Fig. 3.

Referring to the drawing for a detailed description of the embodiment of the invention there shown, and first to Fig. 1, a tractor of the flexible tread or track-laying type is shown, having a main tractor frame 1 for supporting the power unit, power transmission, etc., and spaced frames 2, one only of which is shown. Each of these frames 2 includes spaced sills or beams $2^a$ and $2^b$, and supports the forward portion of a flexible traction-tread 3, the latter being diagrammatically shown in the drawing. For convenience the frames 2 are referred to hereinafter as the "track frames". Each track frame 2 is pivoted on a rearwardly disposed transversely-extending supporting shaft or stud 4, brackets 5 being secured to the rear ends of the frames and extending upwardly therefrom for this purpose. The rear driving sprockets 6 are rotatably mounted upon the stud 4. It will be understood that there are two of these track frames, one arranged at each side of the tractor, but as the construction is similar at both sides a description of the arrangement of one side will be sufficient.

Near the forward end of the track frame 2 is mounted an idler or sprocket 7, being carried on a shaft 8 supported in spaced bearings 9 on the beams $2^a$ and $2^b$. A flexible traction-tread is supported on the forward sprocket or idler 7 and the rear sprocket 6, and is arranged to be driven by the latter.

The position of the forward sprocket is adjustable for the purpose of regulating the tension of the traction-tread. This is accomplished by adjustment of the position of the bearings 9 of the track-frame. As shown particularly in Fig. 5 each bearing 9 is clamped on its supporting beam by clamp mechanism, including a member 10 having upper and lower flanges adapted to engage the inner faces of the upper and lower flanges of the supporting beam. An integral projection $9^a$ extends from the bearing 9 engaging the upper flange of the supporting beam and is disposed adjacent one of the flanges of the member 10, while another clamping member or block 11 engages the outer surface of the lower flange of the sill, a clamping bolt 12 passing through the whole so as to clamp the parts firmly in position. By loosening the bolt 12 the bearing may be slid along the beam to adjust the tension of the flexible traction-tread.

For positively moving the bearings to tighten the traction-tread as stated, rods 13 are mounted in longitudinal position on the track frame, the forward ends thereof being adapted to engage seats 14 formed on the bearings. As shown there are preferably two of these adjusting rods, one being mounted on each of the beams of the track frame, and each rod is supported at its forward threaded end in an internally threaded nut 15 rigidly secured on the respective supporting beam. Each nut is formed with an integral bracket 16 having flanges for engaging the web and upper flange of the supporting sill, to which it is securely bolted. A sleeve 17 may be slidably mounted on each rod to protect the threads and to keep dirt and moisture therefrom. In the embodiment shown this sleeve is supported on the rod by supporting lugs 18 on the interior of the sleeve, the lugs being adapted to contact with the rod.

The opposite end of each adjusting rod is rotatably supported in a bearing 19. Mounted on the rod adjacent said bearing is the sprocket wheel 20, the sprocket wheels on adjacent rods being mounted opposite to each other. In order to permit forward longitudinal movement of the rods 13 in adjusting the idler bearings, a space between the rear bearing and sprocket may be provided. Each bearing 19 is secured to one of the supporting beams by means of a projection 21 extending around the upper flange of the beam and may be secured thereto by set-screws or the like. This connection permits longitudinal adjustment of the bearings 19, when necessary to provide for longitudinal movement of the rods 13.

A bracing member 22 extends between the rear ends of rods 13, and an operating lever 23 is connected to the outer rod for imparting rotative movement thereto. Simultaneous rotation is also imparted to the other adjusting rod by means of a sprocket chain 24 extending between sprockets 20. The adjusting rods are held firmly in spaced relationship at all times by means of the connecting brace 22 which also steadies the parts during operation by the lever 23.

The operation of the adjusting mechanism to properly tension the flexible driving-tread or chain will be clear to those skilled in the art from the foregoing description. It will be noted that the threaded adjusting rods 13 advance and recede simultaneously so as to equalize the adjustment at opposite ends of the idler shaft, keeping said shaft properly positioned and aligned at all times. After the adjustment is completed the idler may be clamped securely in position by tightening the bolts 12 clamping the idler shaft in a position and holding it independently of the adjusting mechanism. Forward adjusting movement of the idler to tighten the tread is effected positively by advancement of the adjusting rods, while rearward adjustment to slaken the tread is accomplished by retracting said rods. In the latter case the tension of the tread chain will aid in sliding rearwardly the supporting bearing of the idler-shaft upon the tractor frame. When the desired adjustment is reached the bearings are clamped firmly in position as before.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent, is:—

1. An adjusting device for flexible traction elements of tractors including, in combination, spaced bearings, a rotary supporting member having an individual supporting shaft supported in said bearings, a flexible traction member supported on said rotary member, threaded nuts mounted adjacent said bearings, threaded rotary adjusting rods threadably engaging said nuts and arranged parallel to each other and having ends positioned for contact connection with the respective bearings, supporting bearings for said adjusting rods spaced from said nuts, operating connections between said adjusting rods to cause them to rotate in unison so as to effect simultaneous adjustment of said first mentioned bearings, a bracing member extending between said adjusting rods adjacent the said operating connections and clamping means for securing said first mentioned bearings in adjusted position independently of said adjusting rods.

2. In a tractor, in combination, a frame for the tractor disposed on one side thereof and having spaced frame members, spaced bearings on said frame members, a rotary supporting member having an individual supporting shaft supported in said bearings, a flexible traction member supported on said rotary member, parallel rotary adjusting rods mounted upon said frame members and operatively associated with said bearings for adjusting the latter on said frame members, means for simultaneously operating said rods to effect said adjustment, and clamping means for clamping said bearings in adjusted position on said frame members.

3. In a tractor, in combination, a frame for the tractor, spaced bearings on said frame, a rotary supporting member carried by said bearings, a flexible traction member supported on said rotary member, threaded nuts secured to said frame adjacent said bearings, threaded adjusting rods co-operating with said nuts, means for simultaneously operating said rods for adjusting said rotary member, and clamping means for securing said bearings to said frame independently of said adjusting means.

4. In a tractor, in combination, a frame for the tractor, disposed at one side thereof and having spaced frame members, spaced bearings on said frame members, a rotary supporting member having an individual supporting shaft supported in said bearings, a flexible traction member supported on said rotary member, threaded nuts mounted on said frame members, threaded adjusting rods arranged parallel to each other and rotatably mounted on said frame members, said adjusting rod engaging the threads of said nuts and being operatively positioned for contact connection with said bearings, means for simultaneously operating said rods to effect adjustment of said bearings, and clamping means for clamping said bearings in adjusted position upon said frame members.

5. In a tractor, in combination, a frame for the tractor disposed on one side thereof and having spaced frame members, spaced bearings on said frame members, a rotary supporting member having an individual supporting shaft supported by said bearings, a flexible traction member supported on said rotary member, threaded nuts mounted on said frame members adjacent said bearings, parallel threaded adjusting rods rotatably mounted on said frame members and engaging the threads of said nuts and being operatively positioned for contact connection with said bearings, means for simultaneously rotating said rods to effect simultaneous adjustment of said bearings, clamping means for securing said first mentioned bearings in adjusted position independently of said adjusting rods, and a shield carried by said rods for protecting the threads thereof.

In testimony whereof I affix my signature.

THOMAS C. LEAKE.